United States Patent
Seki et al.

(10) Patent No.: US 9,108,546 B2
(45) Date of Patent: Aug. 18, 2015

(54) VEHICLE SEAT

(75) Inventors: Yuichiro Seki, Tochigi (JP); Takaya Kurisu, Tochigi (JP); Kenichi Niitsuma, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 8 days.

(21) Appl. No.: 13/991,572

(22) PCT Filed: Dec. 8, 2011

(86) PCT No.: PCT/JP2011/078478
§ 371 (c)(1),
(2), (4) Date: Jun. 4, 2013

(87) PCT Pub. No.: WO2012/077764
PCT Pub. Date: Jun. 14, 2012

(65) Prior Publication Data
US 2013/0257117 A1  Oct. 3, 2013

(30) Foreign Application Priority Data

Dec. 8, 2010  (JP) .................. 2010-273867

(51) Int. Cl.
*A47C 9/00* (2006.01)
*B60N 2/42* (2006.01)
*B60N 2/427* (2006.01)
(Continued)

(52) U.S. Cl.
CPC .......... *B60N 2/4228* (2013.01); *B60N 2/42709* (2013.01); *B60N 2/42745* (2013.01); *B60N 2/68* (2013.01); *B60N 2/682* (2013.01);
(Continued)

(58) Field of Classification Search
CPC ............. B60N 2/42745; B60N 2/4885; B60N 2/4805; B60N 2/4228; B60N 2/42709; B60N 2/68

USPC ............... 297/216.1, 216.15, 216.17, 452.19, 297/452.18, 452.22, 452.1, 216.14, 216.13, 297/452.23

See application file for complete search history.

(56) References Cited

U.S. PATENT DOCUMENTS 5,044,693 A * 9/1991 Yokota .................... 297/452.18
7,066,552 B2 * 6/2006 Yoshida ................... 297/452.18
(Continued)

FOREIGN PATENT DOCUMENTS

JP  07-132767 A  5/1995
JP  11-105602 A  4/1999
(Continued)

OTHER PUBLICATIONS

Extended Search Report issued for EP 11847573.0 (May 23, 2014).
(Continued)

*Primary Examiner* — Chi Q Nguyen
(74) *Attorney, Agent, or Firm* — Drinker Biddle & Reath LLP

(57) ABSTRACT

Provided is a vehicle seat having a high absorbing efficiency of impact energy upon rear end collision. The vehicle seat includes a pair of side frames that are arranged on the side, and lower frames and that connect lower portions of the pair of side frames to each other, in which a narrow portion including: a horizontal portion formed inside the pair of side frames along a longitudinal direction with a flexibility against a load equal to or more than a predetermined impact load, and an inclined portion extending from the horizontal portion via a bent portion inside the pair of side frames is formed on the lower frames.

10 Claims, 11 Drawing Sheets

(51) Int. Cl.
*B60N 2/68* (2006.01)
*B60N 2/70* (2006.01)
*B60N 2/48* (2006.01)

(52) U.S. Cl.
CPC ............ *B60N 2/7094* (2013.01); *B60N 2/4805* (2013.01); *B60N 2/4885* (2013.01)

(56) References Cited

U.S. PATENT DOCUMENTS

| | | | |
|---|---|---|---|
| 7,163,261 B2 * | 1/2007 | Kawashima | 297/216.14 |
| 7,290,837 B2 * | 11/2007 | Sugiyama et al. | 297/452.55 |
| 7,631,933 B2 * | 12/2009 | Fujita et al. | 297/216.12 |
| 8,075,052 B2 * | 12/2011 | Omori et al. | 297/216.12 |
| 8,132,857 B2 * | 3/2012 | Omori et al. | 297/216.12 |
| 8,444,219 B2 * | 5/2013 | Omori et al. | 297/216.12 |
| 8,590,979 B2 * | 11/2013 | Matsumoto et al. | 297/452.18 |
| 8,678,495 B2 * | 3/2014 | Omori et al. | 297/216.12 |
| 2008/0129092 A1 * | 6/2008 | Omori | 297/216.1 |
| 2012/0013108 A1 * | 1/2012 | Yamaki et al. | 280/730.2 |
| 2012/0038199 A1 * | 2/2012 | Matsumoto et al. | 297/452.18 |
| 2013/0187418 A1 * | 7/2013 | Watanabe | 297/216.14 |
| 2013/0264849 A1 * | 10/2013 | Adachi et al. | 297/216.1 |

FOREIGN PATENT DOCUMENTS

| | | |
|---|---|---|
| JP | 2000-118279 A | 4/2000 |
| JP | 2001-186957 A | 7/2001 |
| JP | 2006-213201 A | 8/2006 |
| JP | 2006-347436 A | 12/2006 |
| JP | 4200580 B2 | 12/2008 |
| JP | 2010-173478 A | 8/2010 |
| JP | 2010-179753 A | 8/2010 |

OTHER PUBLICATIONS

Office Action issued for CN 201180058742.4 (Feb. 6, 2015).

* cited by examiner

VEHICLE SEAT

TECHNICAL FIELD

Disclosed herein is a vehicle seat, and more particularly a vehicle seat with an improved impact energy absorption efficiency upon rear end collision.

BACKGROUND

An occupant on a seat is rapidly moved rearward, and the upper body of the occupant inclines rearward during a so-called rear end collision where a rear portion of a vehicle such as a motor vehicle is in a collision from behind, or collides hard during a rearward travel.

Therefore, the upper body of the occupant rapidly approaches a seatback of a vehicle seat due to the inertial force, and an impact is applied to the body of the occupant. The seatback is mainly constructed by placing a cushion material on a metal seatback frame and covering the cushion material with a skin material, which does not provide sufficient deformation amount for the rapid rearward movement of the occupant upon rear end collision or the like and may not efficiently reduce a load applied to the body of the occupant. Moreover, the large load is applied to the seatback and thus some damage may be caused to the seatback.

In order to solve the problems, Japanese Patent Document No. 4200580 ("the '580 document") proposes a technique configuring side frames (described as side members in this document) to bend when a rearward load is applied to an upper portion of a seatback frame, thereby mitigating the load applied to an occupant during the rearward movement.

Moreover, Japanese Patent Document Nos. 2000-118279 A ("the '279 document") and 2006-213201 A ("the '201 document") propose a seatback frame configured to have concavo-convex portions extending in a seat width direction, formed on a lower frame (cross frame in the '279 document) and lower frame portion in the '201 document) constructed in the seat width direction (right and left direction) below a seatback frame. With the recesses and protrusion provided to extend in the seat width direction on the lower frame, when a large load is applied rearward to the seatback frame, the concavo-convex portions can deform, thereby absorbing impact energy.

When a load is applied rearward as a result of a rearward movement of the occupant upon rear end collision or the like, the side frames bend, and the impact energy of the rearward movement is absorbed by the seatback frame disclosed in the '580 document. However, a position to be deformed (bent portion) cannot be limited for deformation in the seatback in this document, and bends occur at any points in the up and down direction on the side frames. As a result, the bending point cannot be limited, and the impact energy is thus transmitted to the entire seatback frame, resulting in a decreased absorption efficiency of the impact energy.

When a large load is applied rearward to the seatback frames disclosed in the '279 and '201 documents, the concavo-convex portions provided in the seat width direction on the lower frame are deformed, thereby absorbing the impact energy while the deformed position of the seatback frame is limited to the portion below the seatback frame.

As described above, according to the techniques of the '279 and '201 documents, the portion that tends to be bent by the large rearward load is provided at a specific position, thereby deforming the portion that tends to be bent, and mitigating the impact upon rear end collision. However, a technique for increasing rigidity of portions other than the portion that tends to bend (deformation portion) to facilitate the restriction of the bent portion, thereby further restricting the bent position, and efficiently absorbing the impact energy is needed.

Moreover, a technique of sufficiently sinking the body of the occupant into the pressure receiving member provided for the seatback frame, thereby efficiently absorbing the impact energy, is needed. In other words, not a technique for facilitating deformation when a large rearward load is applied, but a technique for providing a proper rigidity against the load and sufficiently sinking the body of the occupant into the seatback frame, thereby efficiently absorbing the impact energy, is needed.

SUMMARY

An object according to various embodiments of the present invention is to provide a vehicle seat capable of providing an improved rigidity of portions other than portions which deform to absorb impact energy upon rear end collision, thereby efficiently absorbing the impact energy. Moreover, another object is to provide a vehicle seat with an improved rigidity of portions other than portions that tend to bend (deformation portion) to facilitate restriction of the deformation portions, thereby facilitating guidance of the seatback frame deformation. Further, still another object is to provide a vehicle seat capable of sufficiently sinking the body of an occupant, thereby efficiently absorbing the impact energy.

The problems are solved by a vehicle seat according to various embodiments of the present invention including a pair of side frames that are arranged on the side, and lower frames that connect lower portions of the pair of side frames to each other; in which a narrow portion including: a horizontal portion formed inside the pair of side frames along a longitudinal direction with a flexibility against a load equal to or more than a predetermined impact load, and an inclined portion extending from the horizontal portion via a bent portion inside the pair of side frames is formed on the lower frame.

As described above, the vehicle seat includes the narrow portions on the lower frame. Then, the narrow portion includes the horizontal portion provided to extend approximately horizontally in the longitudinal direction of the lower frame, namely in the right and left direction of the seat, and the inclined portion extending while bending from the horizontal portion. The horizontal portion formed inside the side frames is configured to have the flexibility, and, when a predetermined impact load is applied to the vehicle seat upon rear end collision or the like, can deform to absorb the impact energy.

The impact load applied to the seatback frame constructing the vehicle seat upon rear end collision is a load applied mainly rearward, in more detail, in a direction that the seatback frame inclines rearward. Thus, when the rearward impact load is applied to the seatback frame by the rear end collision or the like, the horizontal portions having the narrow portions can deform (bend), and the entire seatback frame thus deforms to incline rearward, thereby absorbing the impact energy.

Then, the inclined portions bent and extended from the horizontal portions are provided to extend in directions other than the horizontal direction. Thus, when the rearward inclination load is applied to the seatback frame upon rear end collision or the like, the horizontal portions deform to absorb the impact energy, while the inclined portions are hard to deform, thereby increasing rigidity of portions other than portions where the horizontal portions are provided. As a result, only the horizontal portions are caused to efficiently absorb the impact energy.

Further, if the horizontal portions are provided, a lateral load (load in a direction parallel to the extending direction of the horizontal portions) can be received at ridge portions of the horizontal portions, and the rigidity of the lower frame against the lateral load can thus be increased. Further, the inclined portions can also receive the lateral load, and the rigidity against the lateral load is further increased.

In an embodiment, preferably, the lower frame includes a pair of lower frame side portions arranged below the pair of side frames, and a lower frame center portion that connects the pair of lower frame side portions to each other; the lower frame side portion includes a side plate joined to a side plate of the side frame, and an intermediate plate formed by being bent from an end portion of the side plate; and the narrow portion is formed on the intermediate plate.

There may be provided such a configuration that lower frame side portions and the lower frame center portion are provided as a lower frame, and the lower frame side portions include the narrow portions. On the lower frame side portion including the side plate and the intermediate plate, the horizontal portion formed on the lower frame side portion can be made thin to more easily be bent by forming the intermediate plates in the longitudinal direction of the lower frame, and by forming the narrow potions by machining the intermediate plates to form a part of each of the intermediate plates into a recessed shape. Further, this configuration can simplify the configuration of the lower frame side portions. Moreover, each of the lower frame side portions is constructed by the side plate and the intermediate plate, namely plate members, and the weight can be extremely reduced compared to a case where the lower frame side portion is formed into a box shape or the like.

Moreover, in this embodiment, preferably, a harness attachment portion bulging toward a side opposite to a bulging direction of the narrow portion is formed below the bent portion.

In this way, the rigidity of the lower frame against the load can be increased by forming the harness attachment portions around the narrow portions, thereby forming multiple concavo-convex portions including the narrow portions. Then, the load applied to the inclined portion and the bent portion can be received by the harness attachment portion by providing the harness attachment portion below the bent portion of the narrow portion, resulting in an increased rigidity of portions other than the narrow portions in the lower frame.

Moreover, the necessity of independently forming a member for attaching a harness is eliminated by providing the multiple concavo-convex portions and attaching the harness to the part thereof, resulting in space saving. Further, the necessity of independent assembly of a member for attaching the harness is eliminated, resulting in a reduced manufacturing process.

Further, preferably, the narrow portion is formed above the lower frame center portion.

Preferably, the narrow portions formed on the lower frame side portions are arranged at positions which do not overlap the lower frame center portion (in more detail, above the lower frame center portion). If the narrow portions are arranged at positions which do not overlap the lower frame center portion, the rearward load applied to the seatback frame deforms the narrow portions more than the lower frame center portion. Thus, the impact energy is efficiently transmitted to the narrow portions. As a result, when a load in the rearward direction is applied to the seatback frame by rear end collision or the like, deformation of the narrow portions is not prevented by the lower frame center portion, resulting in efficient absorption of the impact energy.

In an embodiment, preferably, a reinforcement portion that reinforces the lower frame is provided at a position displaced from the narrow portion in an up and down direction.

If the vehicle seat includes the reinforcement portion that reinforces the lower frame at a position displaced from the narrow portions in the up and down direction as described above, portions other than the narrow portions of the lower frame are reinforced by the reinforcement portion. Thus, when an impact load is applied, the seatback frame can be restrained from deforming starting from portions other than the narrow portions, and position restriction on the deformation portions and guidance of deformation can be facilitated on the seatback frame.

Moreover, preferably, the reinforcement portion is provided below the narrow portion.

If the reinforcement portions are provided below the narrow portions, rigidity of the portions below the narrow portions are increased in the lower frame, and deformations below the narrow portions are restrained when a rearward impact load is applied, resulting in efficient transmission of the impact energy to the narrow portions. As a result, the position restriction on the deformation portions and the guidance of deformation are further facilitated on the seatback frame.

Further, preferably, the reinforcement portion is provided at a position overlapping at least partially the narrow portion in a front to back direction.

As described above, if the reinforcement portion is provided at a position overlapping at least partially the narrow portion in the front to back direction, the deformations of the narrow potions by an impact load are not prevented, and the directions of the deformations of the narrow portions can be regulated for an input load in a complex direction. This configuration can further facilitate the guidance of deformation, can efficiently absorb the impact energy, and can properly deform the seatback frame.

In an embodiment, preferably the vehicle seat further includes a pressure receiving member that is connected to the pair of side frames via a connection member to support an occupant; and an impact reducing member that is arranged at least on one of the side frames and is connected to the connection member, to move the pressure receiving member rearward by a predetermined impact load applied to the pressure receiving member.

As described above, rearward inclination (rearward movement) of an occupant can be facilitated by receiving the body of the occupant moving rearward on the pressure receiving member upon rear end collision or the like, and configuring the pressure receiving member to be able to move rearward. Then, the impact energy can be more efficiently transmitted to the lower frame side portions constructing the seatback frame by facilitating the rearward inclination of the occupant. As a result, the impact energy due to a rear end collision or the like can be more efficiently absorbed.

Accordingly, in an embodiment, there can be provided a vehicle seat which includes the narrow portions each provided with the horizontal portion and the inclined portion, in which only the horizontal portions are bent, thereby efficiently absorbing an impact energy when an impact load is applied by a rear end collision or the like.

Accordingly, in an embodiment, the narrow portions formed on the lower frame side portions can be bent by a large amount, and the impact energy can be more efficiently absorbed by the narrow portions.

Accordingly, in an embodiment, the number of components can be reduced, and a vehicle seat high in absorption efficiency of the impact energy by increasing the rigidity of portions other than the narrow portions can be provided.

Accordingly, in an embodiment, a vehicle seat which can more efficiently absorb impact energy without degradation of absorption efficiency of the impact energy by way of the lower frame center portion upon rear end collision can be provided.

Accordingly, in an embodiment, when an impact load is applied, the seatback frame can be prevented from deforming starting from portions other than the narrow portions, and the position restriction of the deformation portions, and the guidance of deformation can be facilitated on the seatback frame.

Accordingly, in an embodiment, the deformations are restrained below the narrow portions, and the position restriction of the deformation portions, and the guidance of deformation can be further facilitated.

Accordingly, in an embodiment, deformations of the narrow portions by an impact load are not prevented, and the direction of the deformations of the narrow portions can be regulated for an input load in a complex direction.

Accordingly, in an embodiment, the vehicle seat does not prevent the rearward inclination of the occupant, secures a sufficient sinking amount, and efficiently absorbs the impact energy caused by the rearward inclination load.

DETAILED DESCRIPTION

A description will now be given of an embodiment of the present invention referring to drawings. It should be noted that members, arrangements, and the like described below do not limit the present invention, and can be modified in various ways within the purport of the present invention. Moreover, a vehicle herein refers to a vehicle for travel on which a seat can be installed such as a ground traveling vehicle having wheels such as a motor vehicle and a railroad vehicle, and air planes and ships which do not travel on the ground. Moreover, a normal seating load includes a seating impact generated during seating, and a load during acceleration generated when the vehicle starts rapidly. Moreover, impact energy upon rear end collision is energy by a large load generated upon rear end collision, is caused by a large collision of a vehicle from behind or a serious collision during a rearward travel, and does not include energy by a load in a load range similar to a load generated during normal seating.

FIGS. 1 to 7 relate to a first embodiment of the present invention. A description will now be given of a vehicle seat S according to a first embodiment referring to FIGS. 1 to 7.

Figure 1:
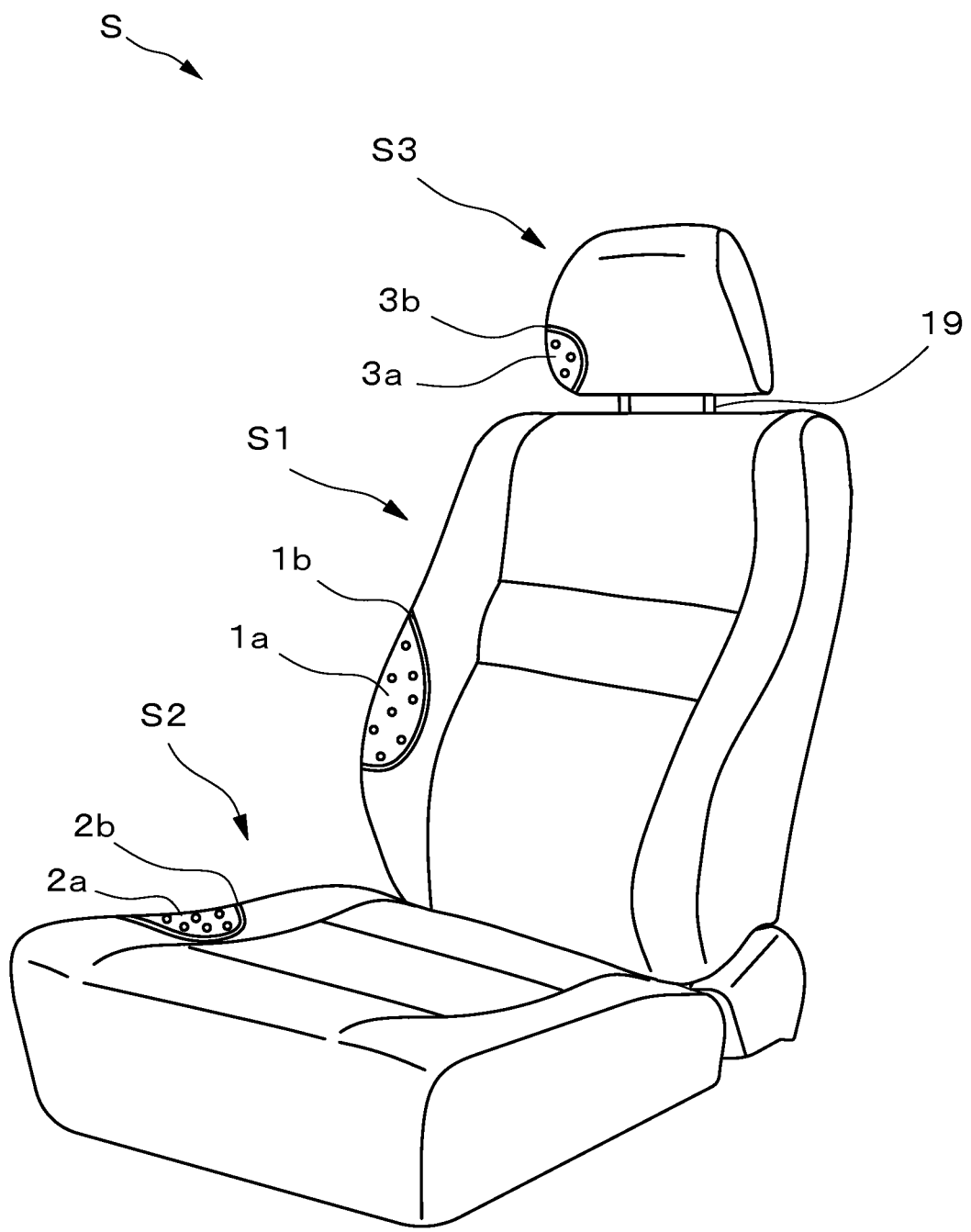
FIG. 1 is a schematic perspective view of a seat according to a first embodiment of the present invention.

The vehicle seat S is constructed by a seatback S1 (back portion), seat base portion S2, and a headrest S3 as shown in FIG. 1, the seatback S1 (back portion) and the seat base portion S2 are respectively formed by placing cushion pads 1a and 2a on the seat frame F, and covering them with skin materials 1b and 2b. The headrest S3 is formed by placing a pad material 3a on a core material (not shown) for a head portion, and covering them with a skin material 3b. Moreover, reference numeral 19 denotes headrest pillars for supporting the headrest S3.

Figure 2:
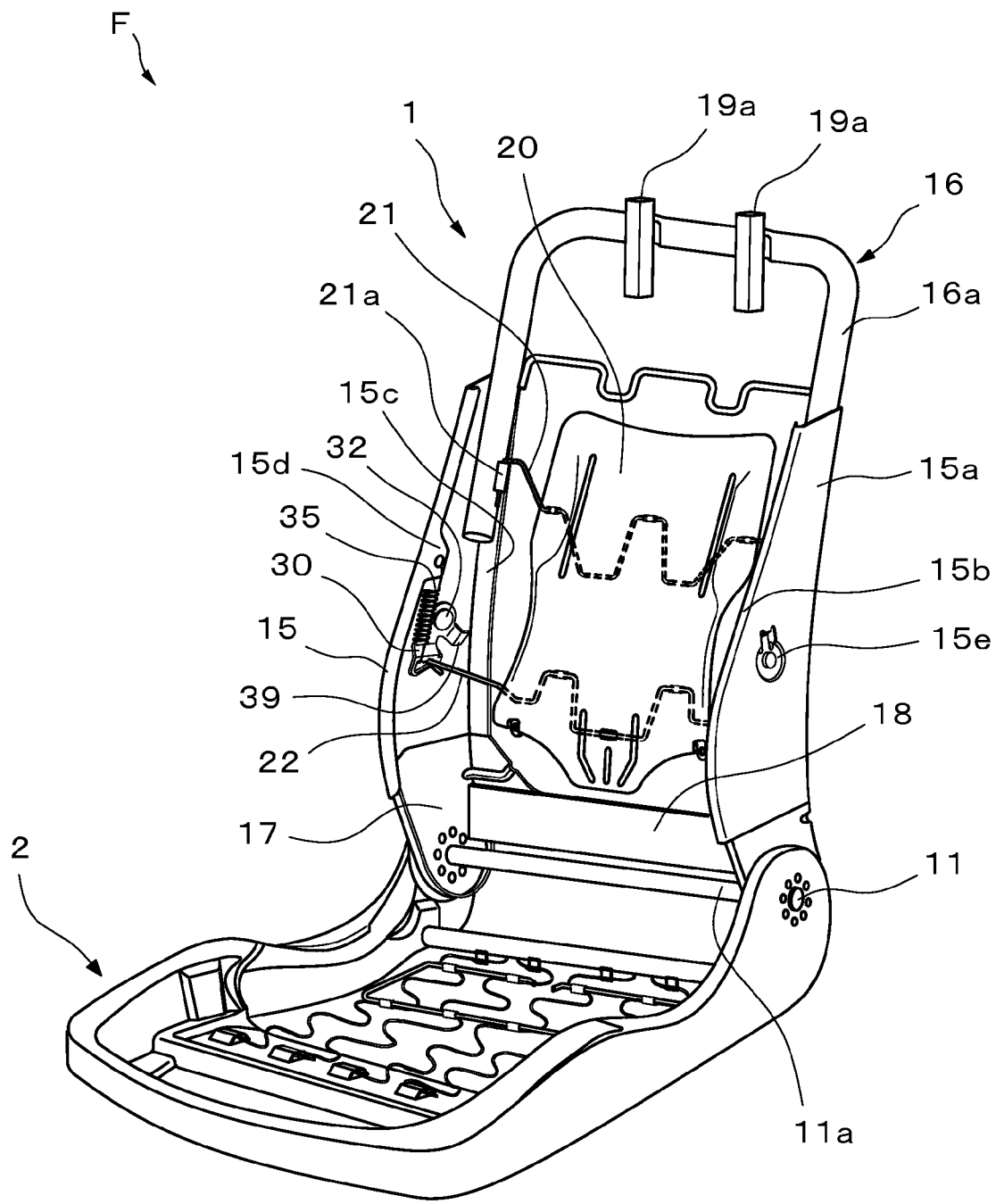
FIG. 2 is a schematic perspective view of a seat frame according to the first embodiment of the present invention.
Figure 3:
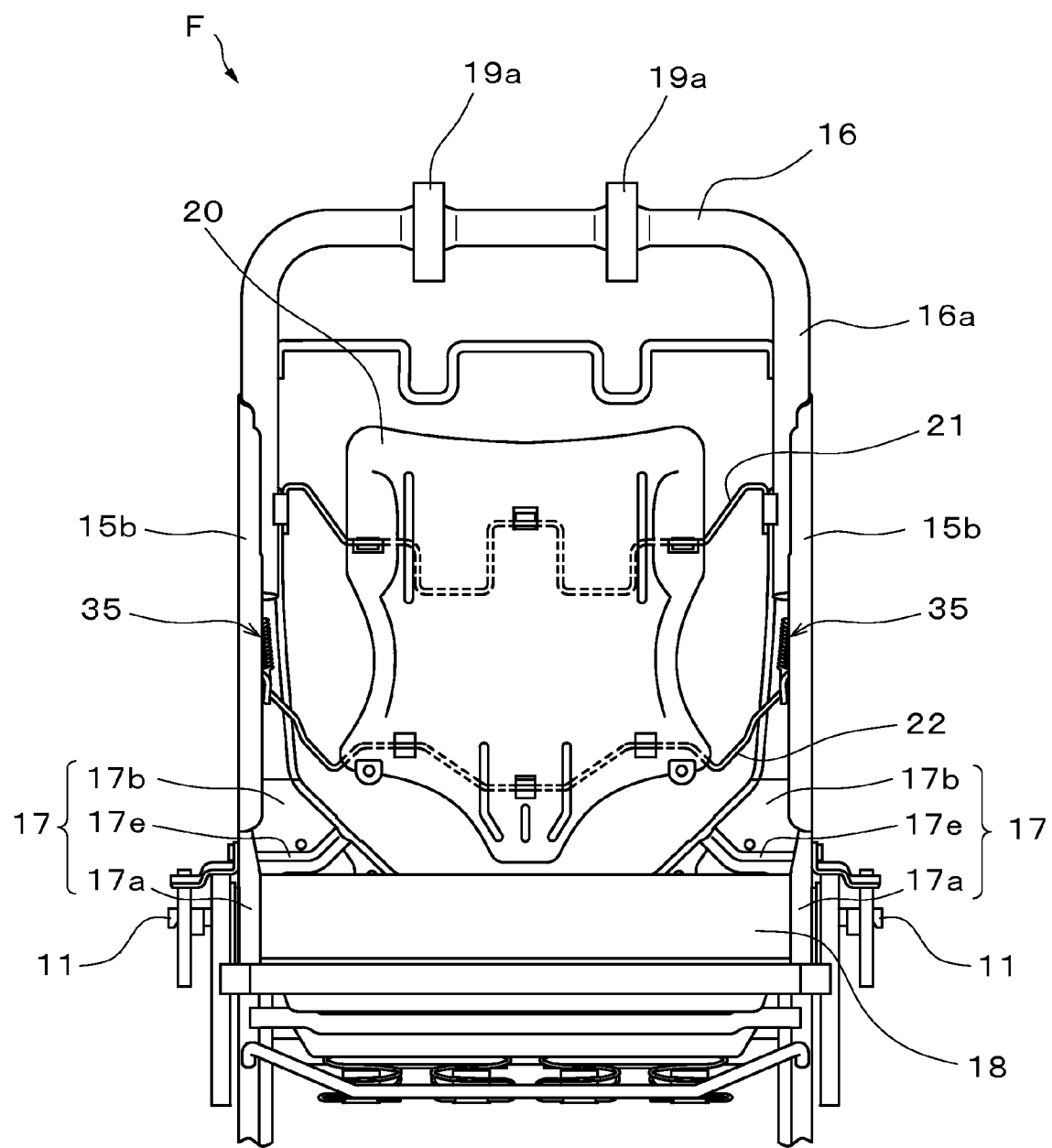
FIG. 3 is a front view of the seat frame according to the first embodiment of the present invention.
Figure 4:
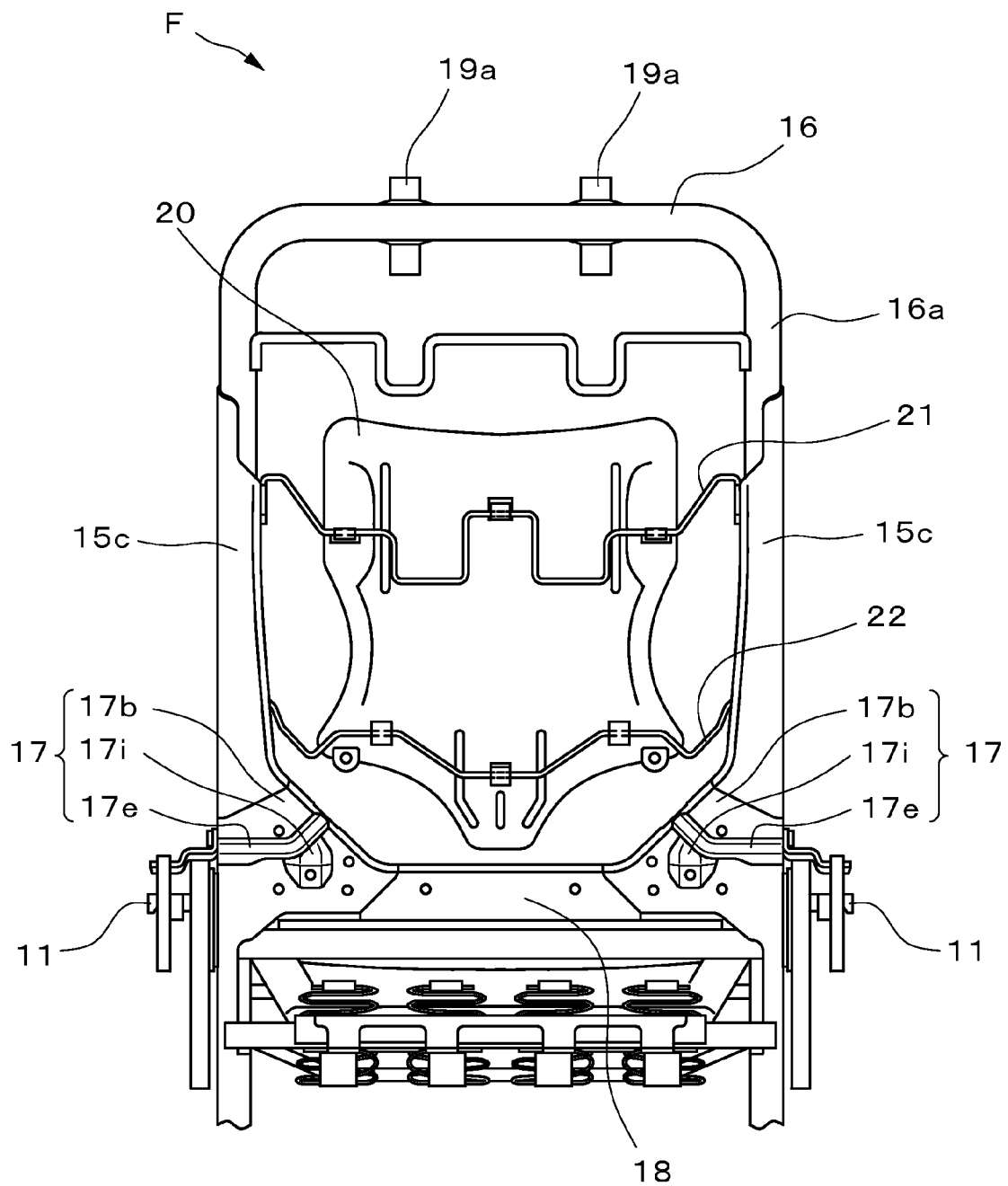
FIG. 4 is a rear view of the seat frame according to the first embodiment of the present invention.

The seat frame F for the vehicle seat S is constructed by a seatback frame 1 for constructing the seatback S1, and a seat base frame 2 for constructing the seat base portion S2 as shown in FIG. 2.

The seat base frame 2 is formed by placing the cushion pad 2a, and covering the cushion pad 2a with the skin material 2b as described above, and is configured to support an occupant from the underside. The seat base frame 2 is supported by a leg portion (not shown), inner rails, which are not shown, are attached to the leg portion, and are assembled to outer rails installed on a floor of a vehicle body to slide for adjusting the position in a front to back direction.

Moreover, a back end portion of the seat base frame 2 is connected to the seatback frame 1 via a reclining mechanism 11.

The reclining mechanism 11 includes at least a reclining shaft 11a along a rotation axis of the reclining mechanism 11, and the reclining shaft 11a is arranged thorough shaft insertion holes 17c (refer to FIG. 6) formed on the pair of lower frame side portions 17 (member sides) provided below the seatback frame 1 (in more detail, a pair of side frames 15) to protrude therefrom on side portions of the seat frame F.

The seatback S1 is formed by placing the cushion pad 1a on the seatback frame 1, and covering the cushion pad 1a with the skin material 1b, and supports the back of the occupant from behind. According to this embodiment, the seatback frame 1 is a frame body in approximately a rectangular shape as shown in FIG. 2, and includes the side frames 15, an upper frame 16, and the lower frame side portions 17.

The two (the pair of) side frames 15 define a seatback width, and are arranged to be separated in the right and left direction, and to extend in the up and down direction. Then, the upper frame 16 for connecting the upper end portion sides of the pair of the side frames 15 to each other extends upward from the side frames 15. The upper frame 16 extends upward from one of the side frames 15, bends, and extends to the other side frame 15.

A lower frame of the seatback frame 1 is constructed by the lower frame side portions 17 and a lower frame center portion 18. The lower frame center portion 18 (member center) is formed to connect the pair of the lower frame side portions 17 arranged to be separated in the right and left direction to each other, and is arranged to be in contact with the lower frame side portions 17. The lower frame side portions 17 are connected to bottom sides of the side plates 15a of the side frames 15. Then, the lower frame side portions 17 are formed to extend below the side plates 15a, and extend within a range which does not cause a problem with the seat base frame 2.

Although, in the seatback frame 1 according to this embodiment, the side frames 15 and the lower frame side portions 17 are formed by independent members, the side frames 15 and the lower frame side portions 17 may be an integral plate frame or the like.

Lower Frame Side Portion 17

The side frames 15, the lower frame side portions 17, and the lower frame center portion 18 are formed as independent members, and can be easily assembled.

Figure 5:
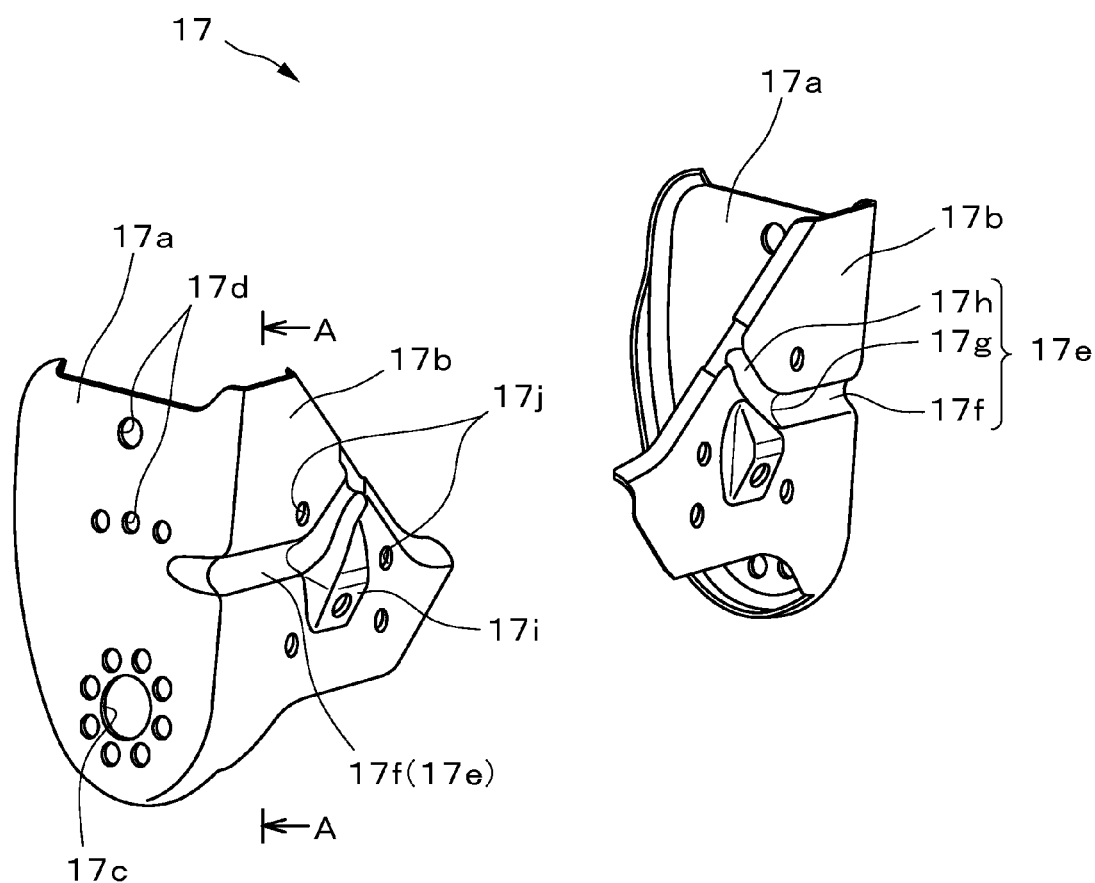
FIG. 5 is a schematic perspective view of lower frame side portions according to the first embodiment of the present invention.

The lower frame side portion 17 includes a side plate 17a joined to the side plate 15a of the side frame 15, and an intermediate plate 17b formed to be folded from a rear end portion of the side plate 17a at approximately the right angle as shown in FIG. 5. The shaft insertion hole 17c for inserting the reclining shaft 11a is formed at a bottom of the side plate 17a.

Moreover, multiple attachment holes 17d for attaching the lower frame side portion 17 to the side frame 15 are formed above the shaft insertion hole 17c on the side plate 17a. Holes are formed in lower portions of the side frames 15 at positions corresponding to the attachment holes 17d when the side plates 17a overlap, and joining elements such as bolts run through the holes formed on the side frames 15 and the attachment holes 17d of the lower frame side portions 17, thereby joining the side frames 15 and the lower frame side portions 17 to each other.

Figure 6:
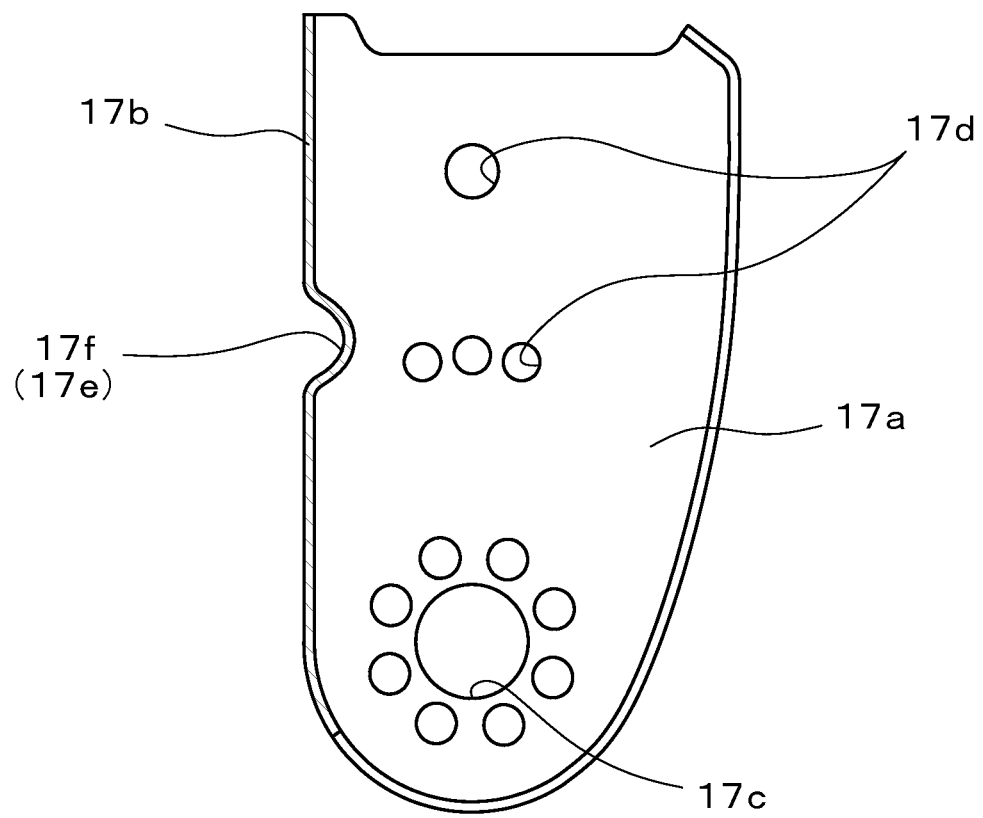
FIG. 6 is a cross sectional view taken along the A-A line in FIG. 5.

Then, a flexible narrow portion 17e as a weak portion for efficiently absorbing impact energy upon rear end collision is formed on each of the intermediate plate 17b as shown in FIG. 6. The narrow portion 17e serving as the weak portion is a recessed portion formed to be approximately semicircular in cross section to bulge forward, and is formed inside the side frame 15 in the right and left direction, namely along the widthwise direction of the seat. In this way, a horizontal portion (horizontal potion 17f) in the narrow portion 17e formed to be approximately semicircular in cross section on the lower frame side portion 17 can bend, and deforms to collapse in the up and down direction (refer to FIG. 7) when a predetermined impact load (impact load larger than that during normal seating) is applied to the seatback frame 1 upon rear end collision or the like. As a result, the rearward inclination load can be efficiently absorbed. Moreover, the horizontal portion 17f is provided to extend along the seat width direction, namely the longitudinal direction of the lower frame center portion 18, and even when a load in the right and left direction is applied, a ridge portion can receive the load, resulting in an extreme increase in rigidity of the lower frame side portion 17.

The horizontal portion 17f extends to a border portion between the intermediate plate 17b and the side plate 17a as shown in FIG. 5, and thus tends to deform when a load is applied, thereby efficiently absorbing the energy of the rearward inclination load.

Then, the narrow portion 17e bends upward as the narrow portion 17e approaches the inside of the seat, and extends to an upper end portion of the intermediate plate 17b. In other words, the narrow portion 17e includes the horizontal portion 17f and an inclined portion 17h provided to extend from the horizontal portion 17f via a bent portion 17g.

As described above, the narrow portion 17e is not configured to have only the horizontal portion 17f extending straight in the horizontal direction, but to include the bent portion 17g, and the portion (inclined portion 17h) which is provided to extend in a direction other than the approximately horizontal direction, namely an oblique direction, can thus absorb energy when a load which deforms the seatback frame 1 to incline the seatback frame 1 rearward is applied by the rear end collision or the like, for example, and increases in rigidity against the load.

Although the inclined portion 17h may be formed to be approximately vertical with respect to the horizontal portion 17f, the inclined portion 17h is preferably formed to be inclined with respect to the horizontal portion 17f. In other words, the inclined portion 17h is preferably configured to form an acute angle or an obtuse angle with respect to the horizontal portion 17f. If the inclined portion 17h is formed to be approximately vertical with respect to the horizontal portion 17f, the inclined portion 17h increases the rigidity of the intermediate plate 17b when a load to incline the seatback frame 1 rearward is applied, and the horizontal portion 17f is harder to be deformed by the rearward inclination load. The inclined portion 17h is configured to form an acute angle or an obtuse angle with respect to the horizontal portion 17f, the intermediate plate 17b appropriately deforms, thereby bending the horizontal portion 17f.

Moreover, a harness attachment portion 17i bulging toward a side opposite to the bulging direction of the narrow portion 17e is formed below the bent portion 17g. In other words, the harness attachment portion 17i is formed to bulge rearward below the bent portion 17g. In this way, the multiple concavo-convex shapes are formed on the intermediate plates 17b by forming the harness attachment portions 17i on the side opposite to the bending direction of the bent portions 17g of the narrow portions 17e (namely, on an obtuse angle side formed between the horizontal portion 17f and the inclined portion 17h) on the intermediate plates 17b, resulting in an increase in rigidity of the lower frame side portions 17 (particularly rigidity in a neighborhood of the bent portions 17g) against the load. As a result, when an impact load is applied upon rear end collision or the like, the horizontal portion 17f, the bent portion 17g, and the inclined portion 17h of each narrow portion 17e deform without bending portions other than the narrow portions 17e to absorb impact energy.

As described above, the harness attachment portion 17i is formed to bulge rearward at the position below the narrow portion 17e on each of the intermediate plates 17b, and functions as a reinforcement portion which prevents portions other than the narrow portion 17e from bending when an impact load is applied upon rear end collision. The increased rigidity resulting from the concavo-convex shapes restricts the rearward deformations of the harness attachment portions 17i, the seatback frame 1 can be prevented from deforming from portions other than the narrow portions 17e, and the position restriction on the deformation portions and the guidance of deformation are facilitated on the seatback frame 1.

Multiple attachment holes 17j are also formed on the intermediate plate 17b. Joining elements such as bolts pass through the attachment holes 17j when other member (such as an actuator) is attached to the seat frame F.

There are provided such effects that a space is saved for attaching other member and the number of components is further reduced by providing the harness attachment portion 17i and the attachment holes 17j on the intermediate plate 17b in this way. Moreover, the harness attachment portion 17i has the function as the reinforcement portion provided rearward of each of the narrow portions 17e, can provide both the function of attaching components and the function as the deformation guide for restricting the deformation portions of the seatback frame, and contributes to the deformations of the seatback frame while reducing the number of components.

The lower frame center portion 18 is joined to the side plates 17a or the intermediate plates 17b of the pair of lower frame side portions 17. If the lower frame center portion 18 is joined to both the side plates 17a and the intermediate plates 17b, attachment rigidity is increased. Further, if side end portions of the lower frame center portion 18 are formed to come in contact with the side plates 17a, rigidity against a lateral load is increased. Although the lower frame center portion 18 is arranged forward of the intermediate plates 17b in this embodiment, the lower frame center portion 18 may be arranged behind the intermediate plates 17b.

The narrow portions 17e are preferably formed at positions which do not overlap the lower frame center portion 18, and are above the lower frame center portion 18. If there is provided such a configuration that the narrow portions 17e are provided at positions which do not overlap the lower frame center portion 18 as described above, when a load in the direction of rearward inclination is applied to the seatback frame 1, the deformations of the narrow portions 17e are not prevented by the lower frame center portion 18.

In other words, the lower frame center portion 18 is at a position displaced in the up and down direction from the narrow portions 17e, and is provided below the narrow portions 17e. As a result of this arrangement, the lower frame center portion 18 functions as a reinforcement portion for increasing rigidity of portions below the narrow portions 17e when a load in the direction of rearward inclination is applied to the seatback frame 1 upon rear end collision. Thus, the lower frame side portions 17 can be prevented from bending from portions other than the narrow portions 17e, and the position restriction on the deformation portions of the seatback frame 1 and the guidance of deformation are facilitated.

The upper frame 16 formed by a member having a closed sectional shape (such as a circular or rectangular sectional shape) is bent in a substantially U shape as shown in FIG. 2. Then, the side surface portions 16a of the upper frame 16 are arranged to partially overlap the side plates 15a of the side frames 15 in the up and down direction, and are anchored to the side frames 15 at the overlapped portions. Although the upper frame 16 is constructed by the tubular member having the circular cross section in the first embodiment, the upper frame 16 may be constructed by a tubular member having a rectangular cross section.

Moreover, the headrest S3 is arranged above the upper frame 16. The headrest S3 is constructed by providing the pad member 3a on an outer peripheral portion of the core material (not shown), and covering the pad material 3a with the skin material 3b as described before. Pillar support portions 19a are arranged on the upper frame 16. Headrest pillars 19 (refer to FIG. 1) for supporting the headrest S3 are attached via guide locks (not shown) to the pillar support portions 19a to attach the headrest S3. Although an example where the seatback S1 and the headrest S3 are formed independently of each other is described in the first embodiment, the seatback S1 and the headrest S3 may be integrated, which is a configuration of the bucket type seat.

The side frames 15 partially constructing the seatback frame 1 are extending members for constructing side surfaces of the seatback frame 1 as shown in FIG. 2, and include the side plates 15a in a flat plate shape, front edge portions 15b each bent inward and folded back in a U shape from a front edge potion (end portion located on the vehicle front side) of the side plates 15a, and rear edge portions 15c each bent inward in an L shape from rear end portions.

A protruded portion 15d protruding toward the rear edge portion 15c side is formed on the front edge portion 15b according to this embodiment, and a lock hole serving as a lock portion for locking an extension coil spring 35 is formed on the protruded portion 15d.

Then, moving members 30, described later, are locked to the side frames 15 according to this embodiment. A configuration and an action of the moving members 30 are described later.

Pressure Receiving Member 20

The pressure receiving member 20 as a pressure receiving member for supporting the cushion pad 1a from behind is arranged on an inside area of the seatback frame 1 inside the seatback frame 1 (between the side frames 15).

The pressure receiving member 20 according to this embodiment is a member obtained by forming a resin into a plate in approximately a rectangular shape, and smooth concavo-convex portions are formed on a surface in contact with the cushion pad 1a. Pawl portions for locking a wire 21 serving as a top connection member, and a wire 22 serving as a bottom connection member are formed on a top side and a bottom side of the pressure receiving member 20 as shown in FIG. 2.

The pressure receiving member 20 according to this embodiment is supported by the connection members. In other words, the two wires 21 and 22 serving as the connection members are provided between the side frames 15 on the both sides, and engage with the pressure receiving member 20 by the pawl portions formed at predetermined positions on the top side and the bottom side on the rear side of the pressure receiving member 20 to support the pressure receiving member 20 on a rear surface of the cushion pad 1a. The wires 21 and 22 are formed by a springy steel wire material, and have concavo-convex portions, which are bent portions, formed thereon.

Particularly, the wire 21 positioned above in the two wires 21 and 22 locked to the pressure receiving member 20 according to this embodiment is constructed by a wire thinner than the wire 22 positioned below. As a result, the pressure receiving member 20 tends to move rearward more at the upper portion than at the lower portion.

Moreover, the wire 22 is constructed by a thicker wire material, is thus high in rigidity, and is hard to deform during normal seating. Thus, the upper portion of the pressure receiving member 20 supported by the wire 21 constructed by the thinner wire material tends to move rearward, and the lower portion of the pressure receiving member 20 supported by the wire 22 constructed by the thicker wire material does not move rearward greatly during normal seating. As a result, the upper portion of the pressure receiving member 20 properly sinks rearward, and the lower portion supports the body of the occupant during normal seating, thereby preventing sense of seating from degrading.

Further, there is provided such a configuration that the wires 21 and 22 have the concavo and convex portions formed thereon, and are thus deformed greatly by a load more than a predetermined load (load larger than a load for moving or pivoting impact reducing members described later) to move rearward the pressure receiving member 20 by a larger movement quantity.

As illustrated in FIG. 2, both end portions of the wire 21 locked to the top side out of the two wires 21 and 22 locked to the pressure receiving member 20 according to this embodiment are hooked on journal portions 21a provided on the side frames 15 on the both sides. Both end portions of the wire 22 locked to the bottom side are hooked on the moving members 30 installed on the right and left side frames 15.

The wire 22 constructed by the thicker wire material than the wire 21 is hard to deform as described above, and the lower portion of the pressure reception portion 20 is thus hard to move rearward during normal seating. Thus, the moving members 30 are attached to the end portions of the wire 22 for securing a sufficient sinking amount upon rear end collision.

Moving Member 30

The moving members 30 serving as impact reducing members are moved rearward of the vehicle by an impact load transmitted via the connection member (wire 22), and simultaneously move rearward the pressure receiving member 20 to move rearward the occupant when an impact load larger than the predetermined impact load is applied to the pressure receiving member 20 upon rear end collision or the like. The "movement" refers to motions such as horizontal translation or pivoting. A description will now be given of the moving members 30 that pivot about shaft portions 32 as pivot axes according to this embodiment. The pressure receiving member 20 can be moved greatly rearward of the vehicle by the movement of the moving members 30 to consequently move rearward the occupant, and the load applied to the occupant can be efficiently reduced.

The moving members 30 are pivotally journaled via the shaft portions 32 serving as pivot axes to the insides of the side plates 15a of the side frames 15 on the both sides, lock the wire 22 at the bottom position serving as the connection member, and are connected to the springs (extension coil springs 35) serving as biasing elements for biasing the wire 22 according to this embodiment as shown in FIG. 2. In other words, the moving members 30 are connected to the biasing elements 35, and are configured to bias the pressure receiving member 20 via the wire 22 serving as the connection member forward of the seatback frame 1.

Then, the moving members 30 according to this embodiment are journaled by the pivotable shaft portions 32 to the inside of the side frames 15, in more detail, to convex portions 15e formed by bulging parts of the side plates 15a toward the inside of the seat.

The above-described moving members 30 are attached to the side frames 15 on both sides, both ends of the wire 22 are hooked to the moving members 30 respectively arranged on both sides, and there is provided such a configuration that the respective moving members 30 are individually activated.

According to this embodiment, the moving members 30 are attached to the side frames 15 on both sides, and the moving members 30 attached to both sides are configured to move (pivot) independently of each other. As a result, if a generated load is biased in the right and left direction, the moving members 30 attached to the side frames 15 on both sides move (pivot) independently of each other according to the load, and the body of the occupant can sink according to the magnitude of the impact load.

A description will now be given of configurations and actions of the pressure receiving member 20 and the moving members 30.

A tensile force of moving rearward (pivoting) the moving members 30 via the cushion pad 1a, the pressure receiving member 20, and the wire 22 inside the seatback S1 is generated during normal seating where the occupant is seated. The extension coil springs 35 bias the moving members 30 to move (pivot) forward of the seatback frame 1. On this occasion, the extension coil springs 35 connected to the moving members 30 have a load characteristic which does not present an extension in a load range generated during normal seating, and the moving members 30 are always held at initial positions. In other words, there is provided such a configuration that a force of returning the moving members 30 to the initial state resisting the force of moving (pivoting) the moving members 30 is maximized during normal seating.

Then, a movement preventing portion 39 provided for each of the moving members 30 is an abutment portion for abutting against a rear edge portion 15c of the side frame 15 to prevent the motion (pivoting) after the moving member 30 moves (pivots).

The movement preventing portion 39 of the moving member 30 is integrally formed by extending the moving member 30 in an outer peripheral direction, an abutment surface thereof abuts against the side frame 15 (rear edge portion 15c in more detail) after the movement (pivot), and the movement (pivot) of the moving member 30 can be stably and reliably stopped even if an impact load more than the predetermined load is applied to the pressure receiving member 20 due to a rear end collision or the like.

The movement preventing portion 39 is formed at a position which does not interfere with the biasing element (extension coil spring 35) and the connection member (wire 22).

Although the movement preventing portions 39 of the moving members 30 directly abut against the side frames 15 to prevent the movement (pivoting) according to this embodiment, a sound reducing member such as rubber having such a thickness as not to obstruct stability of stopping the movement (pivoting) of the moving members 30 may be attached to each of gaps between the movement preventing portion 39 and the side frame 15 in order to remove noise generated upon the abutment, this configuration can stably prevent the movement (pivoting), and a sound reduction effect is expected.

The moving members 30 abut against the side frames 15 (portions formed by partially cutting out the convex portions 15e in more detail) in a normal state, which prevents a force applied upward by the extension coil springs 35, and restricts a movement (pivoting) range to prevent an excessive forward movement (pivoting) of the moving members 30.

Then, when the occupant starts moving rearward by inertia upon rear end collision, a load thereof generates a tension in the direction to move (pivot) rearward the moving members 30 via the pressure receiving member 20 and the wire 22 locked to the pressure receiving member 20. The tensile force extends the extension coil springs 35, which hold the moving members 30 at the initial positions on this occasion, to form a load sufficient to move (pivot) rearward the moving members 30.

A threshold for a force starting the movement (pivoting) of the moving members 30 is set to a value larger than the normal seating load.

In this situation, regarding the threshold for the force starting the movement (pivoting) of the moving members 30, the load applied to the seatback S1 is approximately 150N in the normal seating state (here, small impacts generated by a seating impact and a rapid start of the vehicle are excluded), and the threshold is thus preferably a value larger than 150N.

Moreover, considering the seating impact generated during normal seating, and the load caused by an acceleration generated by the rapid start of the vehicle or the like, the threshold is preferably set to a value larger than 250N, if the threshold is set in this way, the moving members 30 are not activated in cases other than the rear end collision, and the stable state can be maintained.

The wire 22 hooked on the moving members 30 can be moved rearward by moving (pivoting) the moving members 30 rearward as described above, and simultaneously, the pressure receiving member 20 locked to the wire 22 and the cushion pad 1a supported by the pressure receiving member 20 can be moved rearward to sink the occupant into the seatback S1.

The moving members 30 have the movement (pivoting) characteristic for the tensile force generated via the wire 22 as described above, and can thus reliably and efficiently sink the occupant into the cushion pad 1a of the seatback S1 when a rear end collision is generated.

The back of the occupant sinks into the seatback S1 and thus moves rearward on this occasion, the position of the headrest S3 does not change with respect to the seatback S1, a gap between the headrest S3 and the head of the occupant decreases, the head can thus be supported by the headrest S3, and an impact applied to the neck can be efficiently reduced.

Although the example where the moving members 30 are provided on the side frames 15 on both right and left sides is described in the embodiment, there may be provided such a configuration that the moving member 30 may be provided only on one of the side frames 15. In this case, there may be provided such a configuration that the wires 21 and 22 are directly locked to the side frame 15 on which the moving member 30 is not provided.

As described above, in the vehicle seat S, the moving members 30 serving as the impact reducing members are arranged on the side frames 15 to rearward sink the body of occupant upon rear end collision. Then, the narrow portions 17e are provided on the lower frame side portions 17 to efficiently absorb energy of the rearward inclination load applied to the seatback frame 1 by the body of the occupant sinking rearward.

The narrow portion 17e including the horizontal portion 17f and the inclined portion 17h is formed on each of the lower frame side portions 17 as described above. The narrow potions 17e are formed to bulge toward the seating side of the occupant, and each of the lower frame side portions 17 deforms to bend about the narrow portion 17e as a base point, thereby absorbing impact energy upon rear end collision or the like when the occupant rapidly moves rearward upon rear end collision. The protrusion may bulge rearward if the lower frame side portion 17 can be sufficiently bent.

Figure 7:
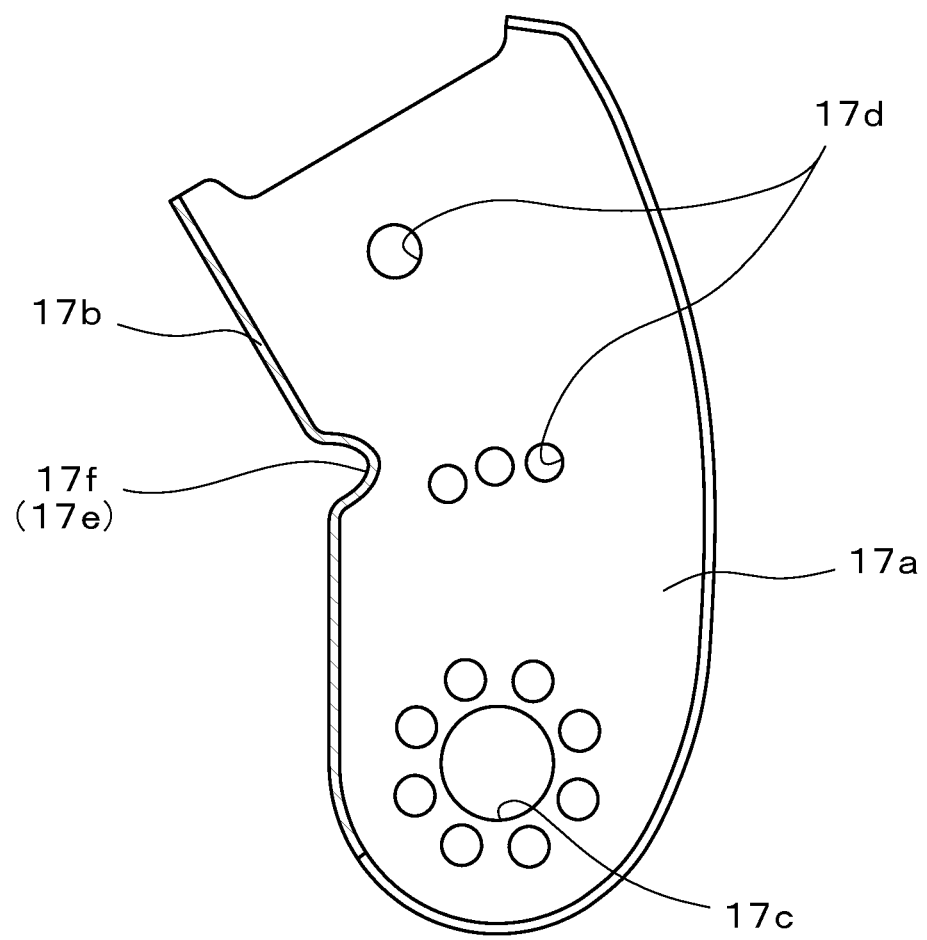
FIG. 7 is an explanatory diagram showing a state of the lower frame side portion after a rear end collision according to the first embodiment of the present invention.

The lower frame side portion 17 includes the narrow portion 17e having the cross section in approximately the arc shape on the intermediate plate 17b forming the lower frame side portion 17 as shown in FIG. 6. Then, there is provided such configuration that, when the occupant moves rearward, and a load of rearward inclination is applied to the seatback frame 1 upon rear end collision or the like, the narrow portions 17e deform as shown in FIG. 7, and the intermediate plates 17b bend rearward about the narrow portions 17e as the base points.

Thus, the plate thickness of portions constructing the narrow portions 17e may be formed to be thin in order to facilitate the deformations of the narrow portions 17e as long as the narrow portions 17e have strength withstanding the normal load.

Then, the narrow portion 17e is constructed by the horizontal portion 17f and the inclined portion 17h across the bent portion 17g as a border.

In this way, the inclined portion 17h is provided in addition to the horizontal portion 17f, which enables not only the absorption of the load energy by deformation of the horizontal portion 17f, but also the increase in strength against the load by the inclined portion 17h. Thus, portions other than the horizontal portion 17f are prevented from deforming, and the rigidity of the lower frame side portion 17 can be increased, resulting in efficient absorption of the impact energy upon rear end collision.

Further, the vehicle seat S includes the pressure receiving member 20 connected to the moving members 30, and can thus sufficiently sink the occupant in the seatback S1 upon rear end collision or the like. Then, the narrow portions 17e of the lower frame (lower frame side portions 17 in more detail) include the inclined portions 17h, and the intermediate plates 17b thus have proper rigidity. The sinking of the pressure receiving member 20 and the moving members 30 with respect to the side frames 15 and the upper frame 16 can thus be facilitated, resulting in efficient absorption of the impact energy generated by a rear end collision or the like.

A description will now be given of the vehicle seat according to a second embodiment referring to FIGS. 8 to 11. In the second embodiment, like members, arrangements, and the like are denoted by the same numerals as of the first embodiment, and a detailed description thereof is therefore omitted.

Figure 8:
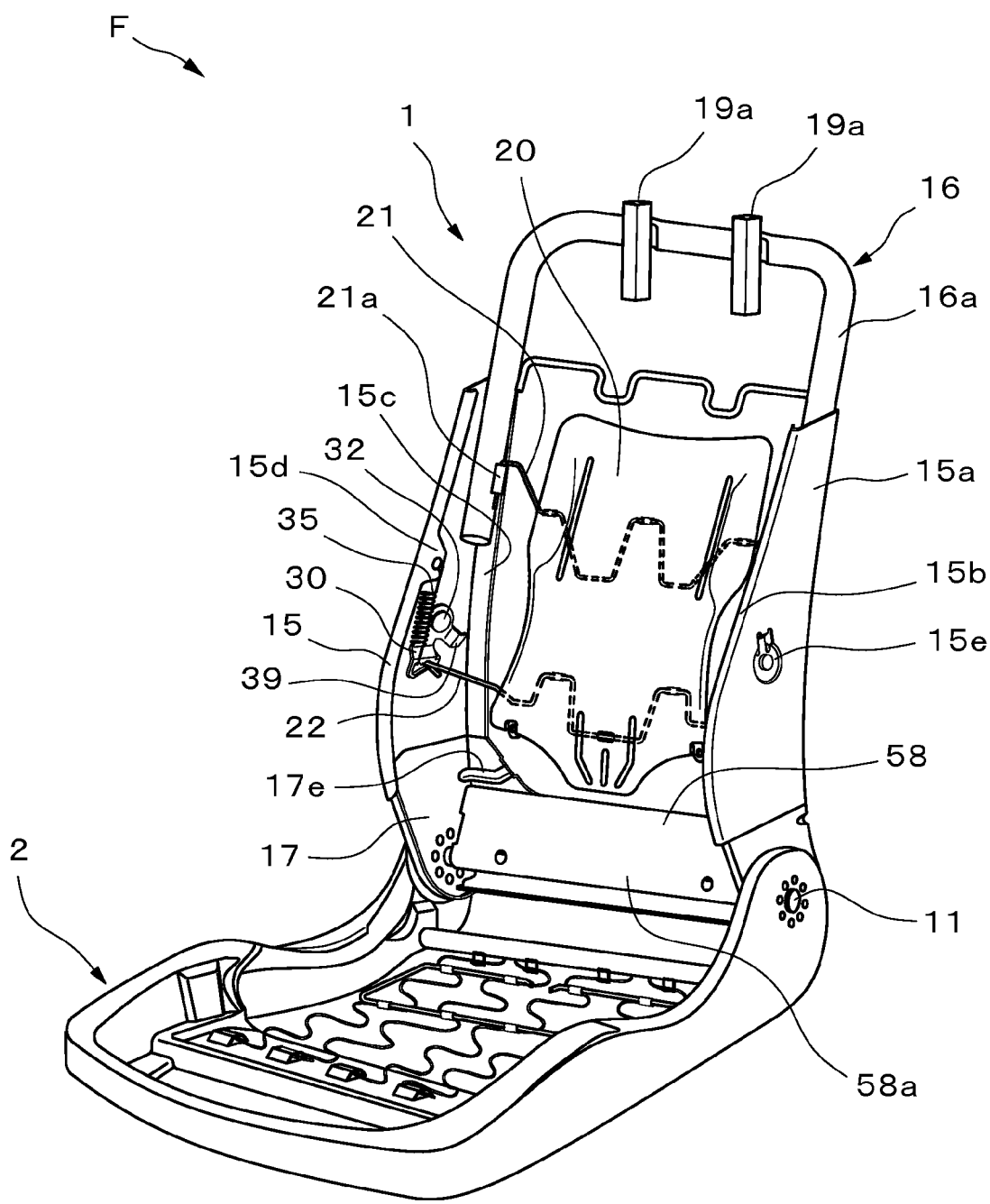
FIG. 8 is a schematic perspective view of the seat according to a second embodiment of the present invention.
Figure 9:
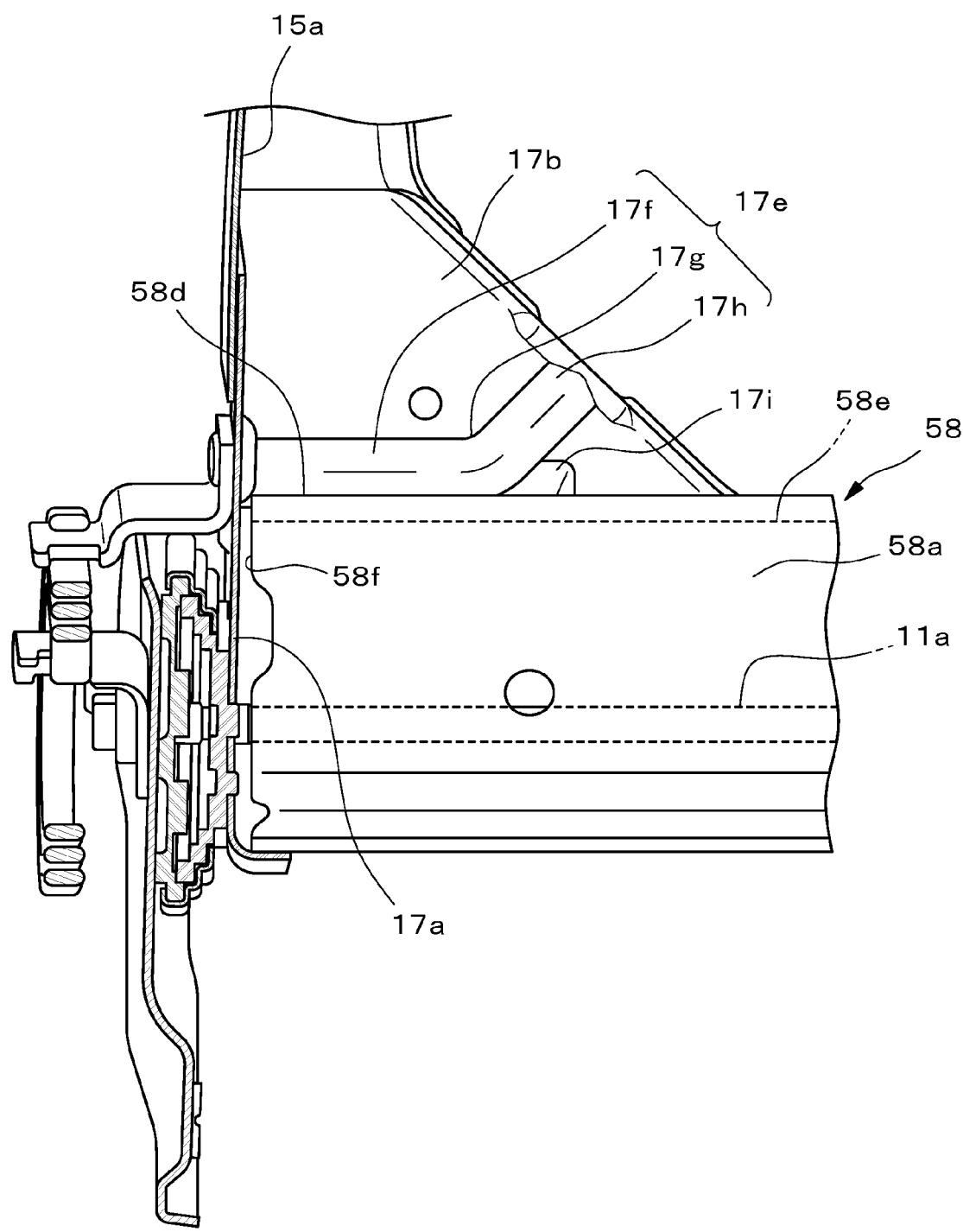
FIG. 9 is a partially enlarged explanatory diagram of a lower frame center portion and a frame side portion according to the second embodiment of the present invention.
Figure 10:
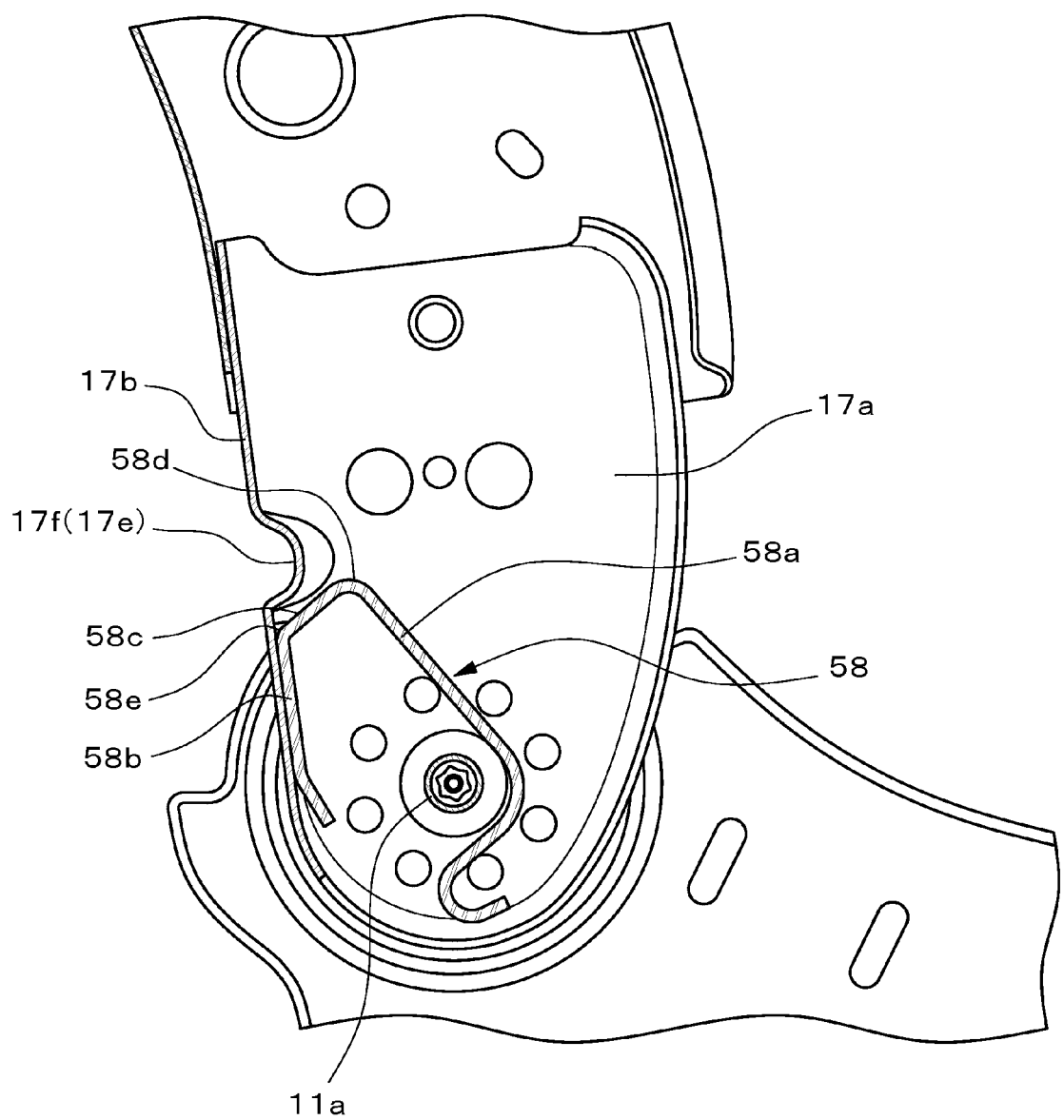
FIG. 10 is a partial cross sectional view of a lower frame according to the second embodiment of the present invention.

A lower frame center potion 58 of the vehicle seat S according to this embodiment is formed by folding a single plate body into approximately a hollow quadrangular prism form, and includes a forward bulging portion 58a, a rear surface 58b opposed to the forward bulging portion 58a, and a connection surface 58c for connecting the forward bulging portion 58a and the rear surface 58b to each other as shown in FIGS. 8 to 10. Regarding the lower frame center portion 58 according to this embodiment, the forward bulging portion 58a is arranged to bulge forward of the reclining shaft 11a, thereby covering the reclining shaft 11a from the front side.

The lower frame center portion 58 according to this embodiment is connected to the lower frame side portions 17 by joining the rear surface 58b opposed to the forward bulging portion 58a and arranged on the rear side to the intermediate plates 17b of the lower frame side portions 17. The rear surface 58b and the lower frame side portions 17 may be joined by way of any method such as welding or fastening by fasteners such as screws and bolts.

The lower frame center portion 58 is arranged at a position corresponding to the lower back of the occupant when the occupant is seated, and is arranged forward of the narrow portions 17e as shown in FIG. 10. Thus, the lower frame center portion 58 receives an impact load applied by the back of the occupant via the cushion pad 1a and the skin material 1b placed on the seatback frame 1 upon rear end collision on a part forward of the intermediate plates 17b of the lower frame side portions 17, and functions as a reinforcement portion for increasing the rigidity of the lower frame side portions 17 against the impact load.

If the reinforcement portion is arranged forward of the narrow portions 17e, an input of the load from the front side to portions of the seatback frame 1 overlapping the reinforcement portion in the front to back direction is restricted, and deformations are restrained from generating from portions other than the narrow portions 17. Thus, when an impact load is applied from the front side, the seatback frame 1 can be prevented from deforming starting from portions other than the narrow portions 17e, and the position restriction on the deformation portions, and the guidance of deformation can be facilitated on the seatback frame 1.

The lower frame center portion 58 serving as the reinforcement portion is at a position displaced from the narrow portions 17e in the up and down direction, and is below the narrow portions 17e, and a upper end 58d of the lower frame center portion 58 overlaps the narrow portions 17e in the front to back direction as shown in FIGS. 9 and 10. Further, the rear surface 58b, which is a joint surface to the intermediate plates 17b is attached to the position which does not overlap the narrow portions 17e in the front to back direction, and is below the narrow portions 17e. Moreover, an upper end 58e of the rear surface 58b is arranged below the horizontal portions 17f to align with the extension direction of the horizontal portions 17f of the narrow portions 17e, namely the longitudinal direction (seat width direction) of the lower frame center portion 58.

In this way, the lower frame center portion 58 is arranged at the position displaced in the up and down direction from the narrow portions 17e, namely at a different level, and the deformations of the narrow portions 17e generated when an impact load is applied to the rear side of the seatback frame 1 are not prevented by the lower frame center portion 58. Moreover, the seatback frame 1 can be restrained from deforming from portions other than the narrow portions 17e, and the position restriction on the portions where the seatback frame 1 deforms and the guidance of deformation are facilitated. According to this embodiment, the lower frame center portion 58 is arranged below the narrow portions 17e, more specifically, the rear surface 58b of the lower frame center portion 58 is attached to the intermediate plates 17b below the narrow portions 17e, rigidity below the narrow portions 17e thus increases to restrain deformations, and the impact energy upon rear end collision can be efficiently transmitted to the narrow portions 17e.

Moreover, at least a part of the lower frame center portion 58, the upper end 58d according to this embodiment, is arranged at the position overlapping the narrow portions 17e in the front to back direction, the input direction can thus be regulated for an input load in a complex direction, the direction of the deformations of the narrow portions 17e can be regulated, and the portions generating the deformations of the seatback frame 1 can be more properly restricted.

Further, the upper end 58e of the rear surface 58b is aligned with the extension direction of the horizontal portions 17f of the narrow portions 17e, and the guidance of the direction of the deformations and a deformation shape of the seatback frame 1 can be facilitated.

Side end portions 58f on both right and left sides of the forward bulging portion 58a according to this embodiment are separated from the side plates 17a of the lower frame side portions 17, and are not fixed to the side portions of the seatback frame 1. Although FIG. 9 shows only the side end portion 58f on the left side viewed from the front side of the vehicle seat S, the side end portion on the right side has the same configuration. In this way, the configuration where the forward bulging portion 58a is not connected to the side plates 17a does not excessively increase the rigidity of reinforcement portion, and does not influence the deformations of the seatback frame 1 upon impact load.

Although the reinforcement portion is arranged below the narrow portions 17e which are the portions where the deformations (bends) of the seatback frame 1 are generated according to this embodiment, there may be provided such a configuration that the reinforcement portion may be provided above the portions where the deformations are generated as the relationship between the portions where the deformations are generated and the reinforcement portion. If the reinforcement portion is arranged at the position which is above and does not overlap, in the front to back direction, the portions where the deformations are generated in this way, the position restriction on the portions where the deformations are generated is facilitated similarly.

A description will now be given of actions of the forward bulging portion 58a and the moving members 30 upon rear end collision.

The forward bulging portion 58a according to this embodiment is arranged at the position corresponding to the back of the occupant when the occupant is seated, and is configured to bulge toward the back of the occupant. As a result, the forward bulging portion 58a has a function of a back entrance preventing member for pushing and stopping a rearward movement of the back of the occupant upon rear end collision.

When the occupant receives an impact upon rear end collision, the occupant is rapidly moved rearward, and the lower back of the occupant comes in contact with the forward bulging portion 58a, and the rearward movement is stopped. As a result, the entire upper body of the occupant inclines (rotates) rearward, and an upper portion of the upper body moves rearward more, and sinks into the seatback S1. Then, the load caused by the rearward movement of the occupant is applied to the pressure receiving member 20, the tensile force is applied in the direction of moving (pivoting) the moving members 30 rearward via the wire 22 locked to the pressure receiving member 20, and the moving members 30 move rearward. The movement of the moving members 30 greatly moves the pressure receiving member 20 rearward, the sinking quantity of the occupant increases, and the impact load is absorbed.

The moving members 30 are provided above the positions of the narrow portions 17e on the side frames 15, the impact load is applied above the narrow portions 17e, and the impact load can be absorbed by the deformations of the seatback frame 1.

The impact load can be absorbed by the action of the moving members 30, the impact load can be absorbed by the action of the narrow portions 17e as described above, and the impact load can thus be absorbed more efficiently.

Although the lower frame center portion 58 is arranged as the reinforcement portion on the front side of the narrow portions 17e in the second embodiment, the arrangement of the reinforcement portion is not limited to this example, and the reinforcement portion may be arranged on the rear side of the narrow portions 17e.

Figure 11:
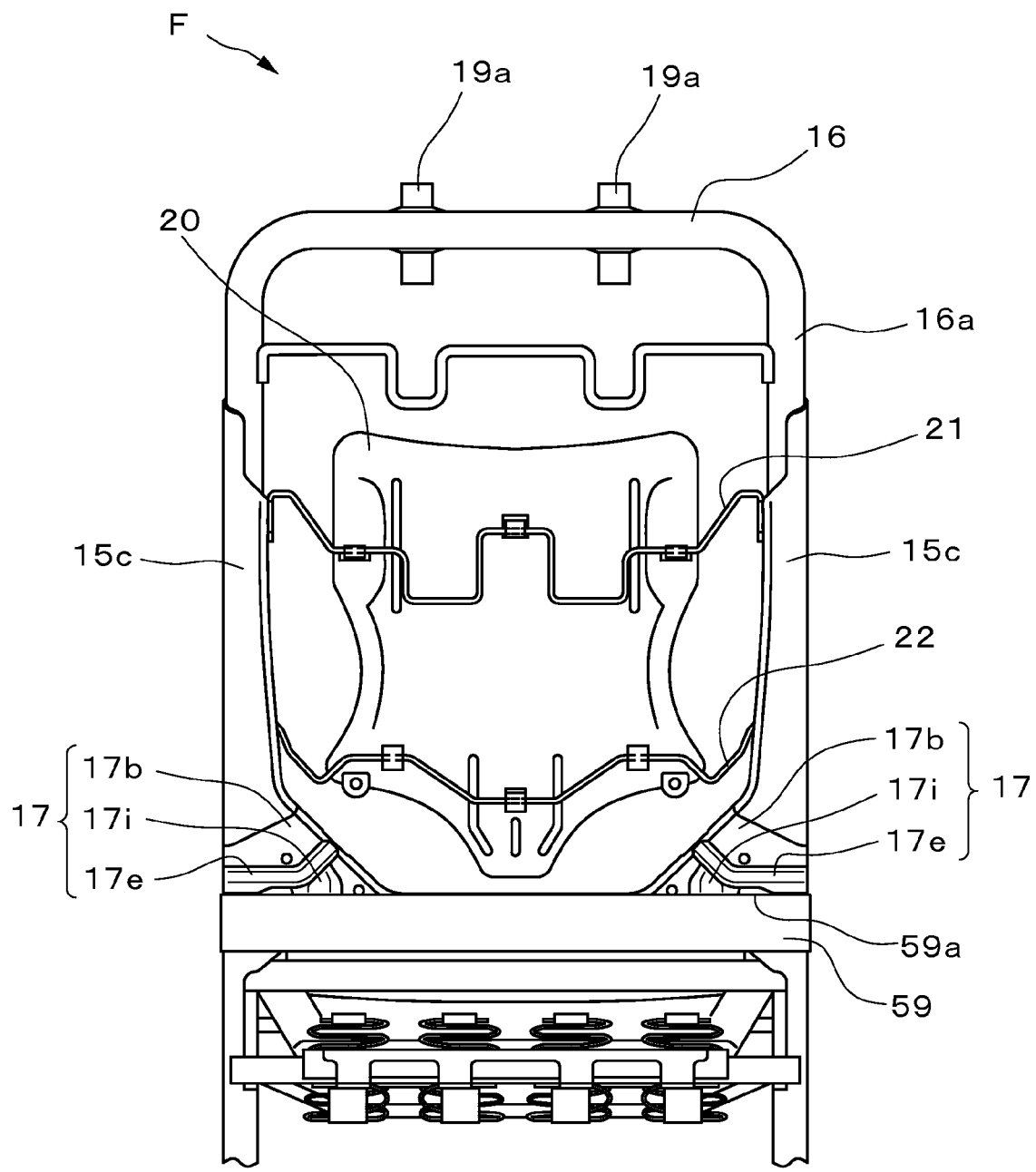
FIG. 11 is a rear view of the seat frame according to the second embodiment of the present invention.

FIG. 11 is a rear view of the seat frame showing another example of the reinforcement portion according to the second embodiment. A reinforcement member 59 in a plate shape is provided as the reinforcement portion rearward of the lower frame (lower frame side portions 17 and the lower frame center portion 58) in this example as shown in FIG. 11. The reinforcement member 59 is provided at a position displaced from the narrow portions 17e in the up and down direction and below the narrow portions 17e, and a upper end 59a is aligned with the extension direction of the horizontal portions 17f, namely, in the longitudinal direction (seat width direction) of the lower frame center portion 58.

If the reinforcement member 59 is arranged rearward of the narrow portions 17e in this way, when an impact load is applied, a rearward deformation of a portion of the seatback frame 1 overlapping the reinforcement member 59 in the front to back direction is restricted, and deformations are restrained from generating from portions other than the narrow portions 17e. As a result, the position restriction on the deformation portions and the guidance of deformation are facilitated on the seatback frame 1.

The vehicle seat according to the second embodiment can stably deform the seatback frame at the specific portions for a complex input load upon rear end collision, and can increase rigidity of portions other than the specific portions which tend to deform, thereby facilitating the position restriction on the deformation portions, and facilitating the guidance of deformation as described above. Thus, even if a complex input load is applied upon rear end collision, impact energy can be efficiently and stably absorbed. Further, the back entrance preventing member is provided for stopping the rearward movement of the lower back of the occupant upon rear end collision, the upper body of the occupant can be greatly moved rearward, thereby increasing the sinking quantity of the occupant, and the impact load can be more efficiently absorbed.

Although the respective embodiments are described for the seatback of the front seat of a motor vehicle as specific examples, the seatback is not limited to the example, and it should be understood that the same configuration can be applied to the seatback of a rear seat.

TABLE OF REFERENCE CHARACTERS

| | | | |
|---|---|---|---|
| s | vehicle seat | | |
| s1 | seatback | | |
| s2 | seat base | | |
| s3 | headrest | | |
| f | seat frame | | |
| 1 | seatback frame | | |
| 2 | seat base frame | | |
| | 1a, 2a, 3a | | cushion pad (pad material) |
| | 1b, 2b, 3b | | skin material |
| 11 | reclining mechanism | | |
| | 11a | | reclining shaft |
| 15 | side frame | | |
| | 15a | | side plate |
| | 15b | | front edge portion |
| | 15c | | rear edge portion |
| | 15d | | protruded portion |
| | 15e | | convex portion |
| 16 | upper frame | | |
| | 16a | | side surface portion |
| 17 | lower frame side portion (lower frame) | | |
| | 17a | | side plate |
| | 17b | | intermediate plate |
| | 17c | | shaft insertion hole |
| | 17d, 17j | | attachment hole |
| | 17e | | narrow portion |
| | 17f | | horizontal portion |
| | 17g | | bent portion |
| | 17h | | inclined portion |
| | 17i | | harness attachment portion (reinforcement portion) |
| 18 | lower frame center portion (lower frame, reinforcement portion) | | |
| 19 | headrest pillar | | |
| | 19a | | pillar support portion |
| 20 | pressure receiving member | | |
| 21 | wire (connection member, upper connection member) | | |
| | 21a | | journal portion |
| 22 | wire (connection member, lower connection member) | | |
| 30 | moving member (impact reducing member) | | |
| 32 | shaft portion | | |
| 35 | extension coil spring (biasing means) | | |
| 39 | movement preventing portion | | |
| 58 | lower frame center portion (lower frame, reinforcement portion) | | |
| | 58a | | forward bulging portion |
| | 58b | | rear surface |
| | 58c | | connection surface |
| | 58d, 58e | | upper end |
| | 58f | | side end portion |
| 59 | reinforcement member | | |
| | 59a upper end | | |

The invention claimed is:

1. A vehicle seat comprising:
a pair of side frames that are arranged on left and right sides of the seat; and
a lower frame having a plate shape that connects lower portions of the pair of side frames to each other;
wherein:
the lower frame comprises a narrow portion that is bulging in a front to back direction; and
the narrow portion comprises:
a horizontal portion formed along a longitudinal direction of the lower frame, and that is flexible in response to a load equal to or more than a predetermined impact load that is larger than a normal seating load;
an inclined portion extending from the horizontal portion via a bent portion in an oblique direction relative to a horizontal direction;
the lower frame comprises:
a pair of lower frame side portions arranged below the pair of side frames; and
a lower frame center portion that connects the pair of lower frame side portions to each other;
the lower frame side portion comprises:
a lower frame side plate joined to a side frame side plate; and
an intermediate plate formed by being bent from an end portion of the lower frame side plate; and
the narrow portion is formed on the intermediate plate.

2. The vehicle seat according to claim 1, wherein a harness attachment portion bulging toward a side opposite to a bulging direction of the narrow portion is formed below the bent portion.

3. The vehicle seat according to claim 2, wherein the narrow portion is formed above the lower frame center portion.

4. The vehicle seat according to claim 1, wherein the narrow portion is formed above the lower frame center portion.

5. The vehicle seat according to claim 1, wherein a reinforcement portion that reinforces the lower frame is provided at a position displaced from the narrow portion in an up and down direction.

6. The vehicle seat according to claim 5, wherein the reinforcement portion is provided below the narrow portion.

7. The vehicle seat according to claim 5, wherein the reinforcement portion is provided at a position overlapping at least partially the narrow portion in a front to back direction.

8. The vehicle seat according to claim 1, further comprising:
a pressure receiving member that is connected to the pair of side frames via a connection member to support an occupant; and
an impact reducing member that is arranged at least on one of the side frames and is connected to the connection member to move the pressure receiving member rearward by a predetermined impact load applied to the pressure receiving member.

9. The vehicle seat according to claim 1, wherein:
the lower frame comprises a rear surface and a side surface; and
the narrow portion is disposed over a corner portion between the rear surface and the side surface.

10. The vehicle seat according to claim 1, wherein:
the lower frame comprises a rear surface facing rearward;
the rear surface of the lower frame comprises at least a first end portion and a second end portion; and
the narrow portion extends continuously from the first end portion to the second end portion.

* * * * *